United States Patent [19]

Frankenberg

[11] 4,241,872
[45] Dec. 30, 1980

[54] PNEUMATICALLY OPERATED THERMOSTAT CONSTRUCTION AND METHOD OF MAKING THE SAME

[75] Inventor: Alfred A. Frankenberg, Knoxville, Tenn.

[73] Assignee: Robertshaw Controls Company, Richmond, Va.

[21] Appl. No.: 54,012

[22] Filed: Jul. 2, 1979

[51] Int. Cl.³ .................................................. G05D 23/08
[52] U.S. Cl. .................................... 236/87; 236/101 E
[58] Field of Search .............. 236/87, 51, 80 R, 101 E; 137/82

[56] References Cited

U.S. PATENT DOCUMENTS

| | | | |
|---|---|---|---|
| 1,933,318 | 10/1933 | Doen | 236/101 E X |
| 2,280,345 | 4/1942 | Nickells | 236/87 X |
| 2,979,068 | 4/1961 | Griswold et al. | 137/82 |
| 3,100,079 | 8/1963 | Stucka | 236/87 |
| 3,580,502 | 5/1971 | Duchek | 137/82 X |
| 3,757,639 | 9/1973 | Baum et al. | 137/82 X |
| 3,809,314 | 5/1974 | Engelke et al. | 236/49 |
| 3,831,841 | 8/1974 | Franz | 236/87 X |
| 4,005,821 | 2/1977 | Slavin et al. | 236/87 |
| 4,007,873 | 2/1977 | Duchek | 236/87 X |

Primary Examiner—William E. Tapolcai, Jr.
Attorney, Agent, or Firm—Candor, Candor & Tassone

[57] ABSTRACT

A thermostat construction having a valve unit for directing a pneumatic signal to a pneumatically operated control device in relation to the force differential between the temperature sensed by the temperature sensing unit thereof and the temperature setting of a temperature setting unit thereof, the construction having a lever pivotally mounted thereto and being operatively interconnected to the valve unit at a first portion of the lever and to the temperature setting unit and the temperature sensing unit at a second portion of the lever by a post-like member. The post-like member has a pivot section thereof pivotally interconnected to the lever at the second portion thereof to operatively interconnect the temperature setting unit and the temperature sensing unit to the second portion of the lever to compensate for any misalignment between the operating parts. The temperature setting unit comprises a bimetal member and the post-like member has a link pivotally mounted thereto and provided with a pin that bears against the bimetal member to pivotally interconnect the bimetal member to the link and, thus, to the post-like member.

22 Claims, 3 Drawing Figures

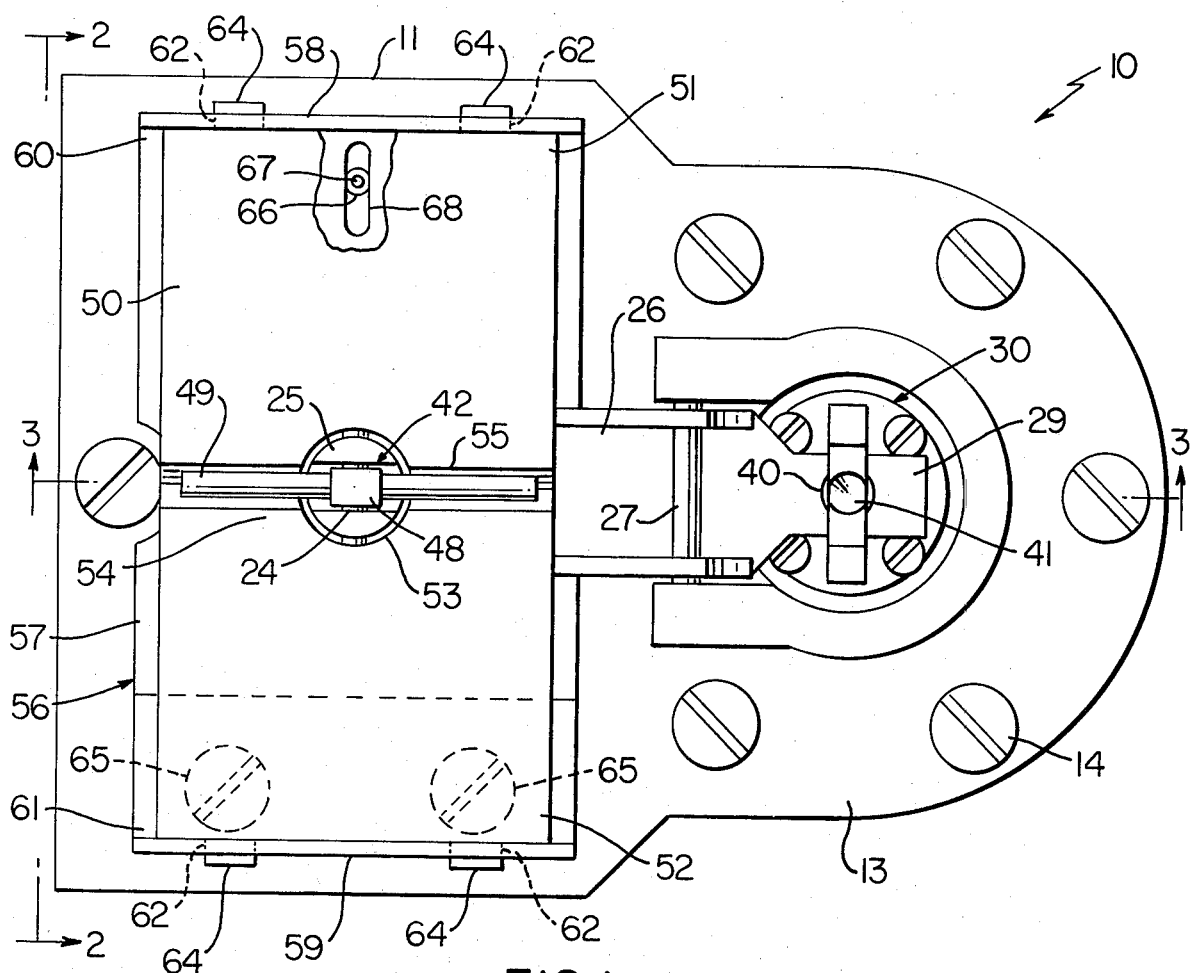
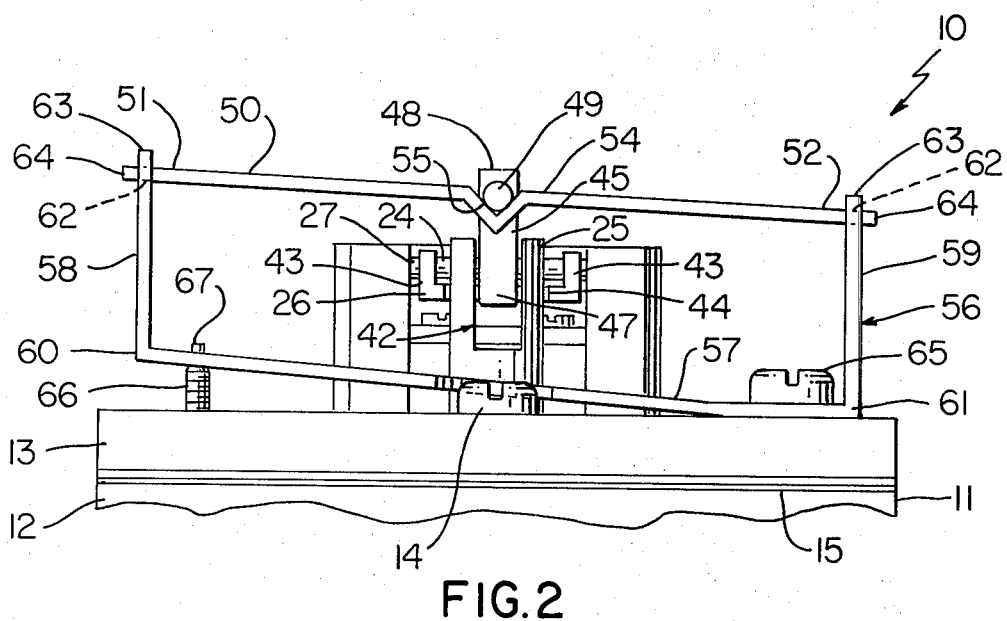

PNEUMATICALLY OPERATED THERMOSTAT CONSTRUCTION AND METHOD OF MAKING THE SAME

BACKGROUND OF THE INVENTION

1. Field of the Invention

This invention relates to an improved pneumatically operated thermostat construction and to an improved method of making such a thermostat construction or the like.

2. Prior Art Statement

It is known to applicant to provide a thermostat construction having valve means for directing a pneumatic signal to a pneumatically operated control device in relation to the force differential between the temperature sensed by the temperature sensing means thereof and the temperature setting of a temperature setting means thereof, the construction having a lever pivotally mounted thereto and being operatively interconnected to a valve means at a first portion means of the lever and to the temperature setting means and the temperature sensing means at a second portion means of the lever by a post-like member.

For example, see the following item:

(1) Copending U.S. patent application, Ser. No. 043,346, filed May 29, 1979.

It appears that the post-like member of the thermostat construction of item (1) above has a reduced portion thereof disposed in a keyway slot in one end of the lever to operatively interconnect the temperature sensing means and temperature setting means to that portion of the lever of the thermostat construction.

SUMMARY OF THE INVENTION

It is a feature of this invention to provide an improved pneumatically operated thermostat construction.

In particular, one embodiment of the improved thermostat construction of this invention has unique means for overcoming slight misalignment of parts thereof and/or improved calibration means for the temperature sensing means thereof.

For example, one embodiment of this invention provides a thermostat construction having valve means for directing a pneumatic signal to a pneumatically operated control device in relation to the force differential between the temperature sensed by the temperature sensing means thereof and the temperature setting of a temperature setting means thereof, the construction having a lever pivotally mounted thereto and being operatively interconnected to the valve means at a first portion means of the lever and to the temperature setting means and the temperature sensing means at a second portion means of the lever by a post-like member. The post-like member has a pivot means pivotally interconnected to the lever at the second portion means thereof to operatively interconnect the temperature setting means and the temperature sensing means to the second portion means of the lever so as to compensate for slight misalignments between the post-like member and the temperature setting means and temperature sensing means as will be apparent hereinafter. The temperature sensing means comprises a bimetal member carried by the construction and being operatively interconnected to the post-like member by interconnection means whereby the bimetal member is operatively interconnected to the second portion of the lever. The interconnection means comprises a link having a pivot means pivotally mounted to the post-like member and having a pin means, the bimetal member bearing against the pin means to pivotally interconnect the bimetal member to the link, and, thus, to the post-like member.

In addition, the thermostat construction of this invention can carry a U-shaped bracket having a cross member interconnected at the opposed ends thereof to a pair of legs, the opposed ends of the temperature sensing bimetal of the thermostat construction being respectively interconnected to the free ends of the legs of the U-shaped bracket. The cross member of the U-shaped bracket has one end thereof secured to the construction and the other end thereof adjustably carried by the construction whereby adjustment of that end of the bracket will flex the bracket and thereby calibrate the bimetal member as will be apparent hereinafter.

Accordingly, it is an object of this invention to provide an improved thermostat construction having one or more of the novel features of this invention as set forth above or hereinafter shown or described.

Another object of this invention is to provide a method of making such a thermostat construction or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a top view of the improved thermostat construction of this invention.

FIG. 2 is an end view of the thermostat construction illustrated in FIG. 1 and is taken in the direction of the arrows 2—2 of FIG. 1.

DESCRIPTION OF THE PREFERRED EMBODIMENTS

Figure 3:
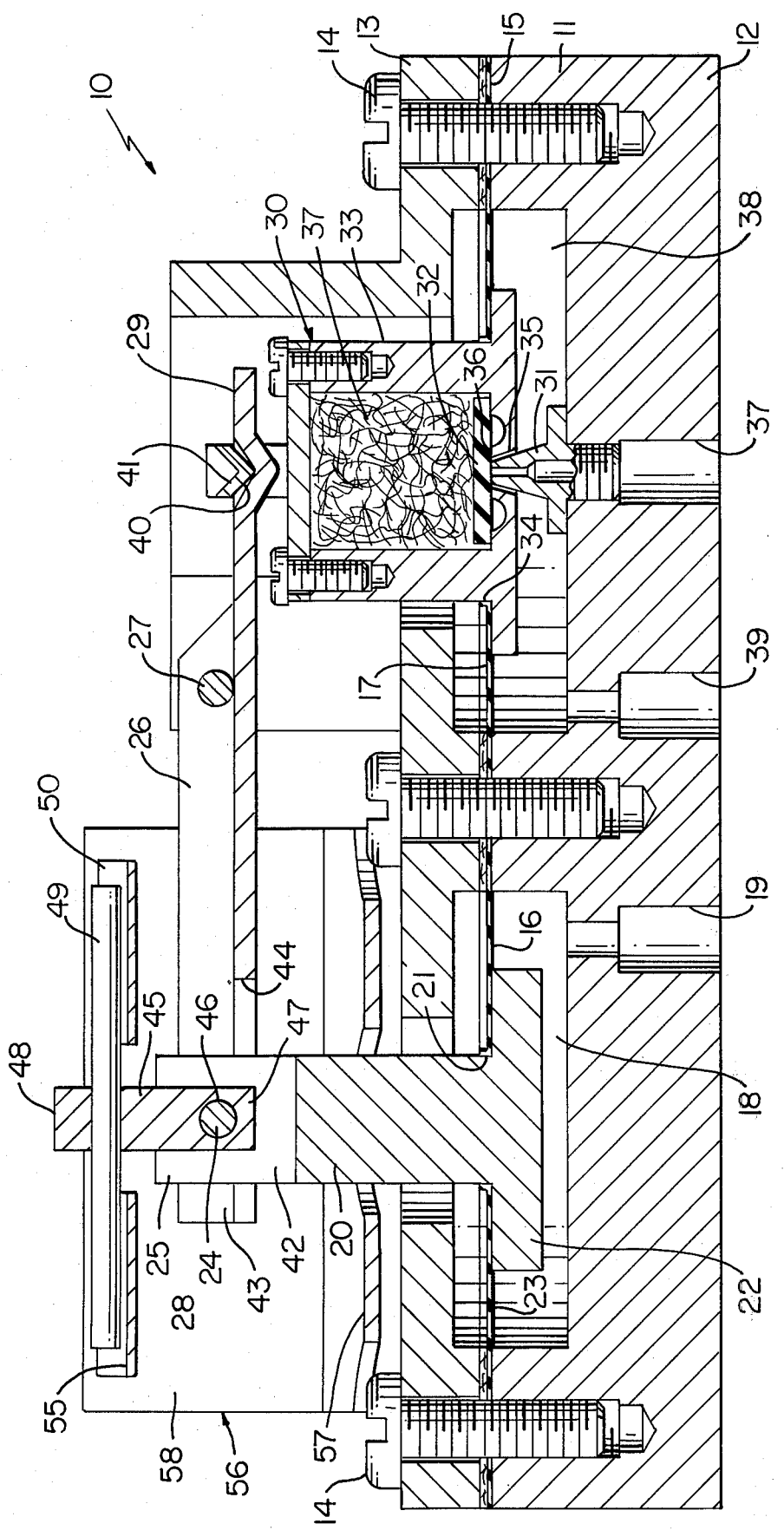
FIG. 3 is an enlarged cross-sectional view taken on line 3—3 of FIG. 1.

While the various features of this invention are hereinafter described and illustrated as being particularly adapted to provide a thermostat construction for a vehicle heat exchanger system, such as the system that is fully disclosed in the aforementioned copending patent application, Ser. No. 043,346, filed May 29, 1976, it is to be understood that the various features of this invention can be utilized singly or in any combination thereof to provide a thermostat construction for other systems as desired.

Therefore, this invention is not to be limited to only the embodiments illustrated in the drawings, because the drawings are merely utilized to illustrate one of the wide variety of uses of this invention.

Referring now to FIGS. 1-3, the improved thermostat construction of this invention is generally indicated by the reference numeral 10 and comprises a housing means 11 formed of two housing members 12 and 13 secured together by suitable fastening means 14 and sandwiching therebetween a one-piece die cut flexible diaphragm member 15 which cooperates with the housing members 12 and 13 to define two operative coplanar diaphragms 16 and 17 with the diaphragm 16 comprising a pneumatic temperature setting means for the thermostat construction 10 in a manner hereinafter described and the diaphragm 17 comprising a feedback means for the thermostat construction 10 as will be apparent hereinafter.

The diaphragm 16 cooperates with the housing means 11 to define a chamber 18 which is adapted to be interconnected by a passage means 19 to a pneumatic signal source (not shown) such as the temperature set point adjuster for a transportation vehicle as set forth in the aforementioned copending patent application, which will create a vacuum signal in the chamber 18 to set the temperature setting of the thermostat construction 10 as will be apparent hereinafter.

A post-like member 20 passes through an opening 21 in the diaphragm 16 so that an enlarged end 23 of the post-like member 20 will bear against the side 23 of the diaphragm 16 and be secured thereto in any suitable manner whereby the post-like member 20 will move upwardly and downwardly in FIG. 3 in unison with the diaphragm 16 depending upon the value of the pressure differential acting across the diaphragm 16 as will be apparent hereinafter.

The post-like member 20 carries a pivot pin 24 which extends outwardly and transversely relative to the end 25 thereof to pivotally interconnect the end 25 of the post-like member 20 to a lever 26 that is pivotally interconnected to the housing means 11 by its pivot pin means 27 as illustrated.

In this manner, the pivot pin 24 of the post-like member 20 interconnects the post-like member 20 to an end 28 of the lever 26 which has its other end 29 operatively interconnected to a valve means that is generally indicated by the reference numeral 30.

The valve means 30 comprises a fixed valve seat 31 and a movable valve member 32 disposed within a cup-shaped cage-like member disposed and secured within an opening 34 in the diaphragm 17 so as to be carried thereby, the fixed valve seat 31 being adapted to project through an opening 35 in the cage-like member 33 and engage against the valve member 32 to move the same off of a valve seat surface 36 thereof in opposition to the force of a porous filtering material 37 disposed in the cage-like member 33 and tending to urge the valve member 32 against the valve seat surface 36 to close the opening 35 of the cage 33.

The fixed valve seat 31 is adapted to be interconnected by a passage 37 in the housing means 11 to a vacuum source, such as the vacuum manifold of the internal combustion engine of the aforementioned transportation vehicle.

The diaphragm 17 cooperates with the housing means 11 to define a branch chamber 38 which will be interconnected to the fixed valve seat 31 when the valve member 32 opens the valve seat 31 in a manner hereinafter described, the branch chamber 38 being adapted to be interconnected to a pneumatically operated control device by a passage 39 in the housing 11 whereby the branch vacuum signal being created in the branch chamber 38 by the valve means 30 will be conveyed by the passage 39 to operate the control device, such as a heat exchanger duct damper, in a manner well known in the art and as fully described in the aforementioned copending patent application.

The end 29 of the lever 26 is operatively interconnected to the valve means 30 by having a V-shaped notch 40 thereof bearing against a V-shaped flange 41 of the cage 33 so that pivoting movement of the lever 26 is transmitted to the cage 33 of the valve means 30 as will be apparent hereinafter.

The end 25 of the post-like member 20 is interrupted by a medial slot 42 that is disposed substantially parallel and intermediate a pair of leg ends 43 of the end 28 of the lever 26 that are defined by a slot 44 formed in the end 28 of the lever 26 as illustrated in FIGS. 2 and 3.

In this manner, the pivot pin 24 spans the slot 42 of the post-like member 20 and pivotally interconnects to both leg ends 43 to pivotally interconnect the post-like member 20 to the lever 26.

The pivot pin 24 also pivotally interconnects a link 45 to the post-like member 20 by passing through a suitable opening 46 in the end 47 of the link 45 which is disposed in the slot 42 of the post-like member 20 so that the other end 48 of the link 45 can extend above the end 25 of the post 20 and carry a transversely disposed rod-like member 49 that projects outwardly beyond the opposed sides of the link 45 to operatively interconnect the link 45 to a plate-like bimetal member 50.

In particular, the plate-like bimetal member 50 has opposed ends 51 and 52 and is provided with a central opening 53 passing through a medial portion 54 thereof that telescopically receives the link 45 therethrough so that the transverse pin 49 can be received in and bear against a V-shaped notch 55 formed in the medial portion 54 of the bimetal member 50 on opposite sides of the link 45 as illustrated whereby the continuous upward bias movement of the bimetal member 50 that is caused by being bowed between its ends 51 and 52 will continuously tend to pull upwardly on the link 45 and, thus, on the post-like member 20 in opposition to the pressure differential acting across the disphragm 16 to thereby position the lever 26 in a certain pivot position relative to the housing means 11 and, thus, position the valve means 30 in relation to the force differential between the diaphragm 16 and bimetal member 50 as will be apparent hereinafter.

The bimetal member 50 is carried by a unique U-shaped bracket of this invention that is generally indicated by the reference numeral 56 and comprises a cross member 57 interconnected to a pair of legs 58 and 59 respectively at opposed ends 60 and 61 of the cross member 57.

In particular, the legs 58 and 59 of the U-shaped bracket 56 respectively have a plurality of slot means 62 passing through the upper end portion 63 thereof and respectively receive outwardly directing tabs 64 of the respective ends 51 and 52 of the bimetal member 50 therein as illustrated so that the medial portion 54 of the bimetal member 50 will be bowed between the ends 51 and 52 thereof when the same has the rod 49 of the link 45 received in the notch means 55 thereof as illustrated in FIG. 2.

The end 61 of the cross member 57 of the U-shaped bracket 56 is secured to the housing means 11 by fastening means 65 while the end 60 of the cross member 57 is adjustably carried by the housing means 11.

In particular, an adjustable calibration screw 66 is carried by the housing means 11 and has a reduced end 67 thereof projecting through an elongated slot 68, FIG. 1, of the end 60 of the cross member 57 so that adjusting of the screw 66 will adjust the end 60 of its cross member 57 of the U-shaped bracket 56 upwardly or downwardly relative to the housing means 11 through flexure of the cross member 57 and, thus, change the initial set position of the end 51 of the bimetal member 50 relative to the end 52 thereof and thereby set the initial calibration of the bimetal member 50 for the thermostat construction 10.

From the above, it can be seen that the set point diaphragm 16 and the temperature sensing bimetal member 50 are operatively interconnected to the lever 26 on the side 28 of the fulcrum or pivot means 27 of the lever 26 and the branch or feedback diaphragm 17 and the cage 33 and, thus, the valve means 30 are connected to the lever 26 on the other side 29 of the fulcrum or pivot means 27 of the lever 26.

The lever ratio can be selected so as to permit the use of a reasonably sized feedback diaphragm 17 for the reasons fully set forth in the aforementioned copending patent application and the use of the lever 16 permits the use of a single die cut diaphragm member 15 for forming both of the diaphragms 16 and 17 as described in the aforementioned copending patent application.

Thus, it can be seen that the thermostat construction 10 of this invention can be formed of a relatively few parts and in a relatively simple manner by the method of this invention to operate in a manner now to be described.

Assuming that a certain vacuum signal exists in the chamber 18 of the thermostat construction 10 and is constant with the thermostat construction 10 being balanced as illustrated in FIG. 3, a temperature change sensed by the bimetal member 50 to cause the upward force in FIG. 3 generated by the bimetal 50 to decrease, will cause the lever 26 to rotate counterclockwise in FIG. 3 a slight amount, due to the net effect of the vacuum in the chamber 18 tending to pull the diaphragm 16 downwardly in opposition to the upward biasing force of the bimetal member 50, thereby lifting the cage 33 upwardly and, thus, its valve member 32 off of the fixed valve seat 31 so that the branch chamber 38 can be further evacuated by the vacuum source interconnected to the passage 37. This increase in the vacuum level beneath the diaphragm 17 in FIG. 3 is transmitted by the passage 39 to the desired pneumatically operated control device to change the operating position thereof as is well known in the art. The increased vacuum in the branch chamber 38, in effect, pulls downwardly on the feedback diaphragm 17 to thereby cause the lever 26 to rotate back in a clockwise direction to thereby again balance the thermostat construction 10 and thereby maintain the new vacuum level in the branch chamber 38 until the bimetal member 50 senses another change in temperature or the vacuum level in the setting chamber 18 is changed, such as by a change in the temperature setting of the aforementioned set point adjuster (not shown) interconnected to the passage 19.

Conversely, if a temperature change causes the upward bimetal force of the bimetal member 50 to increase, this results in a clockwise movement of the lever 26 about the pivot point 27 in FIG. 3 to move the cage 33 downwardly relative to the fixed valve seat 31 and lift the valve member 32 off of its seating relation with the valve surface 36 of the cage 33 and admit air into the branch chamber 38 through the now open opening 36. This lowers the vacuum level in the branch chamber 38 and such change in the branch signal being directed to the pneumatically operated control device by the passage 39 causes the same to change its position as is well known in the art. In addition, the lowering of the vacuum level in the branch chamber 38 reduces the pressure differential acting across the feedback diaphragm 17 so that the feedback diaphragm 17 returns the lever 26 in a counterclockwise direction to again place the lever 26 and, thus, the thermostat construction 10 in the balanced condition illustrated in FIG. 3.

Of course, changes in the vacuum level in the set point signal being directed to the set point chamber 18 of the thermostat construction 10 changes the force requirement of the bimetal member 50 to effect a system balance and accordingly, sets the temperature at which the thermostat construction 10 is to be in balance.

Should it be desired to calibrate the bimetal member 50, the adjusting screw 66 can be threaded outwardly or inwardly to cause the cross member 57 of the U-shaped bracket 56 to flex relative to the housing means 11 and, thus, position the end 63 of the leg 59 in a desired position so that the end 51 of the bimetal member 50 is calibrated relative to the end 52 thereof.

Also, it can be seen that the link 45 of the post-like member 20 will maintain its rod 49 fully seated in the notch 55 of the bimetal member 50 regardless of slight misalignment of the bimetal member 50 relative to the post-like member 20 as the link 45 can pivot relative to the post-like member 20 on the pivot pin 24, the post-like member 20 likewise being adapted to pivot relative to the lever 26 by the pivot pin 24 whereby the link 45 and pivot means 24 allows for slight misalignment of the parts that are interconnected to the lever 26 to connect the same to operate in the above manner. Thus, it can be seen that the link 45 and pivot pin 24 act as a universal joint between the bimetal member 50 and post-like member 20.

In this manner, the continuous upward bias of the bimetal member 50 having its downwardly bowed medial portion 54 acting upwardly on the rod 49 of the link 45 is transmitted by the pin 24 to the post-like member 20 to continuously tend to urge the post-like member 20 upwardly in opposition to the pressure differential acting across the positioning diaphragm 23 that is also interconnected to the post-like member 20.

Thus, it can be seen that the bimetal member 50, through the link 45, and the positioning diaphragm 16 are operatively interconnected by the post-like member 20 to the end 28 of the lever 26 while the valve means 30 of the thermostat construction 10 is interconnected to end 29 of the lever 26, the unique link 45 of this invention permitting slight misalignment of the various parts to still operate in an accurate manner and the unique bracket 56 of this invention permitting initial calibration of the bimetal member 50 as previously described.

Therefore, it can be seen that this invention provides an improved thermostat construction and method of making the same.

While the form and method of this invention now preferred have been illustrated and described as required by the Patent Statute, it is to be understood that other forms and method steps may be utilized and still fall within the scope of the appended claims.

What is claimed is:

1. In a thermostat construction having valve means for directing a pneumatic signal to a pneumatically operated control device in relation to the force differential between the temperature sensed by a temperature sensing means thereof and the temperature setting of a temperature setting means thereof, said construction having a lever pivotally mounted thereto and being operatively interconnected to said valve means at a first portion means of said lever and to said temperature setting means and said temperature sensing means at a second portion means of said lever by a post-like member, said post-like member having a pivot means pivotally interconnected to said lever at said second portion means thereof to operatively interconnect said temperature setting means and said temperature sensing means to said second portion means of said lever, said temperature sensing means comprising a bimetal member carried by said construction, said bimetal member being operatively interconnected to said post-like member by interconnection means whereby said bimetal member is operatively interconnected thereby to said second portion means of said lever, the improvement wherein said interconnection means comprises a link having a pivot means pivotally mounted to said post-like member and having a pin means, said bimetal member bearing against said pin means to pivotally interconnect said bimetal member to said link and, thus, to said post-like member.

2. A thermostat construction as set forth in claim 1 wherein said temperature setting means is pneumatically operated.

3. A thermostat construction as set forth in claim 2 wherein said temperature setting means includes a flexible diaphragm, said post-like member being carried by said diaphragm to operatively interconnect said diaphragm to said second portion means of said lever.

4. A thermostat construction as set forth in claim 1 wherein said pivot means of said post-like member and said pivot means of said link comprises the same pivot means.

5. A thermostat construction as set forth in claim 4 wherein said pivot means of said post-like member and said link comprises a pivot pin disposed substantially at a right angle relative to said pin means of said link.

6. A thermostat construction as set forth in claim 1 wherein said bimetal member has opposed ends respectively carried by said construction, said bimetal member having a portion thereof intermediate said ends thereof operatively interconnected to said pin means.

7. A thermostat construction as set forth in claim 6 wherein said bimetal member has an opening passing through said portion thereof and telescopically receiving a part of said link therethrough, said pin means bearing against said portion of said bimetal member adjacent said opening to operatively interconnect said bimetal member to said post-like member.

8. A thermostat construction as set forth in claim 6 wherein said construction has a U-shaped bracket provided with a cross member and a pair of legs respectively interconnected to opposed ends of said cross member, said opposed ends of said bimetal member being respectively interconnected to said legs of said U-shaped bracket.

9. A thermostat construction as set forth in claim 8 wherein said cross member of said U-shaped bracket has one end thereof secured to said construction and the other end thereof adjustably carried by said construction whereby said bracket can be adjusted to calibrate said bimetal member.

10. In a thermostat construction having valve means for directing a pneumatic signal to a pneumatically operated control device in relation to the temperature sensed by a bimetal member having opposed ends carried by said construction and an intermediate portion thereof operatively interconnected by a post-like member to a first portion means of a lever pivotally mounted to said construction and having a second portion means thereof operatively interconnected to said valve means, said construction carrying a U-shaped bracket having a pair of legs and a cross member interconnected at opposed ends thereof to said pair of legs, said opposed ends of said bimetal member being respectively interconnected to said legs of said U-shaped bracket, the improvement wherein said cross member of said U-shaped bracket has one end thereof secured to said construction and the other end thereof adjustably carried by said construction whereby said bracket can be adjusted to calibrate said bimetal member.

11. A thermostat construction as set forth in claim 10 wherein said post-like member carries a pin means, said bimetal member having an opening passing through said portion thereof and telescopically receiving part of said post-like member therethrough, said pin means bearing against said portion of said bimetal member adjacent said opening to operatively interconnect said bimetal member to said post-like member.

12. In a method of making a thermostat construction having valve means for directing a pneumatic signal to a pneumatically operated control device in relation to the force differential between the temperature sensed by a temperature sensing means thereof and the temperature setting of a temperature setting means thereof, said construction having a lever pivotally mounted thereto and being operatively interconnected to said valve means at a first portion means of said lever and to said temperature setting means and said temperature sensing means at a second portion means of said lever by a post-like member, said post-like member having a pivot means pivotally interconnected to said lever at said second portion means thereof to operatively interconnect said temperature setting means and said temperature sensing means to said second portion means of said lever, said temperature sensing means comprising a bimetal member carried by said construction, said bimetal member being operatively interconnected to said post-like member by interconnection means whereby said bimetal member is operatively interconnected thereby to said second portion means of said lever, the improvement comprising the steps of forming said interconnection means from a link having a pivot means pivotally mounted to said post-like member and having a pin means, and bearing said bimetal member against said pin means to pivotally interconnect said bimetal member to said link and, thus, to said post-like members.

13. A method of making a thermostat construction as set forth in claim 12 and including the step of forming said temperature setting means to be pneumatically operated.

14. A method of making a thermostat construction as set forth in claim 13 and including the step of forming said temperature setting means from a flexible diaphragm, and causing said post-like member to be carried by said diaphragm to operatively interconnect said diaphragm to said second portion means of said lever.

15. A method of making a thermostat construction as set forth in claim 12 and including the step of forming said pivot means of said post-like member and said pivot means of said link to comprise the same pivot means.

16. A method of making a thermostat construction as set forth in claim 15 and including the step of forming said pivot means of said post-like member and said link to comprise a pivot pin disposed substantially at a right angle relative to said pin means of said link.

17. A method of making a thermostat construction as set forth in claim 12 and including the steps of causing the opposed ends of said bimetal member to be respectively carried by said construction, and operatively interconnecting a portion of said bimetal member intermediate said ends thereof to said pin means.

18. A method of making a thermostat construction as set forth in claim 17 and including the steps of forming said bimetal member with an opening passing through said portion thereof and telescopically receiving a part of said link therethrough, and bearing said pin means against said portion of said bimetal member adjacent said opening to operatively interconnect said bimetal member to said post-like member.

19. A method of making a thermostat construction as set forth in claim 17 and including the steps of providing a U-shaped bracket provided with a cross member and a pair of legs respectively interconnected to opposed ends of said cross member, and interconnecting said opposed ends of said bimetal member respectively to said legs of said U-shaped bracket.

20. A method of making a thermostat construction as set forth in claim 19 and including the steps of securing one end of said cross member of said U-shaped bracket to said construction, and causing the other end of said cross member to be adjustably carried by said construction whereby said bracket can be adjusted to calibrate said bimetal member.

21. In a method of making a thermostat construction having valve means for directing a pneumatic signal to a pneumatically operated control device in relation to the temperature sensed by a bimetal member having opposed ends carried by said construction and an intermediate portion thereof operatively interconnected by a post-like member to a first portion means of a lever pivotally mounted to said construction and having a second portion means thereof operatively interconnected to said valve means, said construction carrying a U-shaped bracket having a pair of legs and a cross member interconnected at opposed ends thereof to said pair of legs, said opposed ends of said bimetal member being respectively interconnected to said legs of said U-shaped bracket, the improvement comprising the steps of securing one end of said cross member of said U-shaped bracket to said construction, and causing the other end of said cross member to be adjustably carried by said construction whereby said bracket can be adjusted to calibrate said bimetal member.

22. A method of making a thermostat construction as set forth in claim 21 and including the steps of forming said post-like member to carry a pin means, forming said bimetal member with an opening passing through said portion thereof and telescopically receiving part of said post-like member therethrough, and bearing said pin means against said portion of said bimetal member adjacent said opening to operatively interconnect said bimetal member to said post-like member.

* * * * *